No. 877,876. PATENTED JAN. 28, 1908.
M. F. WILLIAMS.
CRUSHER AND PULVERIZER
APPLICATION FILED APR. 1, 1907.

Witnesses
Edgar T. Farmer
A. J. McCauley.

Inventor:
Milton F. Williams
by Bakewell Cornwall
Atty's.

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, OF ST. LOUIS, MISSOURI, A CORPORATION OF MISSOURI.

CRUSHER AND PULVERIZER.

No. 877,876.  Specification of Letters Patent.  Patented Jan. 28, 1908.

Application filed April 1, 1907. Serial No. 365,708.

*To all whom it may concern:*

Be it known that I, MILTON F. WILLIAMS, a citizen of the United States, residing at St. Louis, Missouri, have invented a certain new and useful Improvement in Crushers and Pulverizers, of which the following is a full, clear, and exact description, such as will enable others skilled in the art to which it appertains to make and use the same, reference being had to the accompanying drawings, forming part of this specification, in which—

Figure 1:
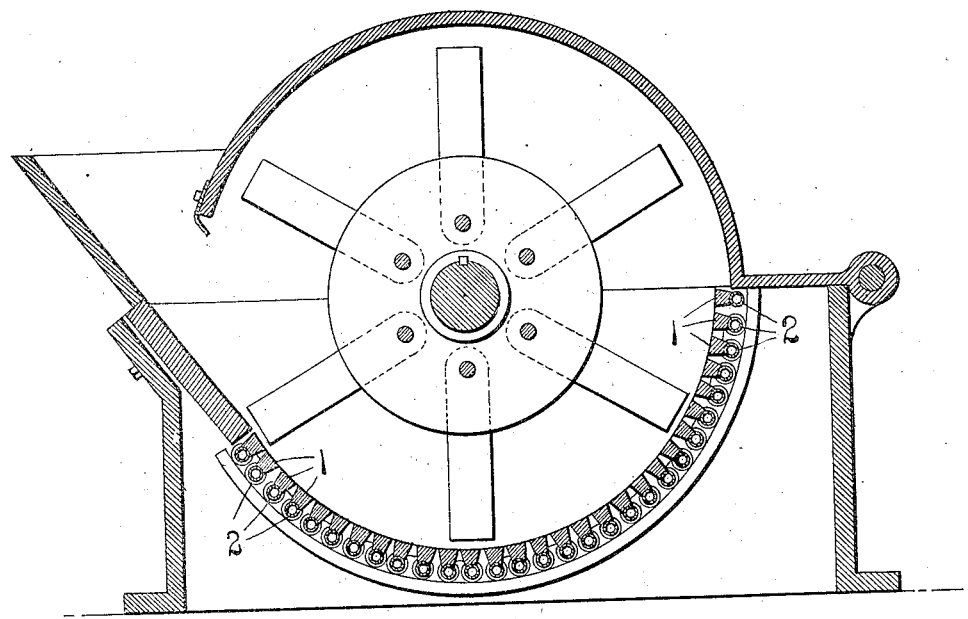
Figure 2:
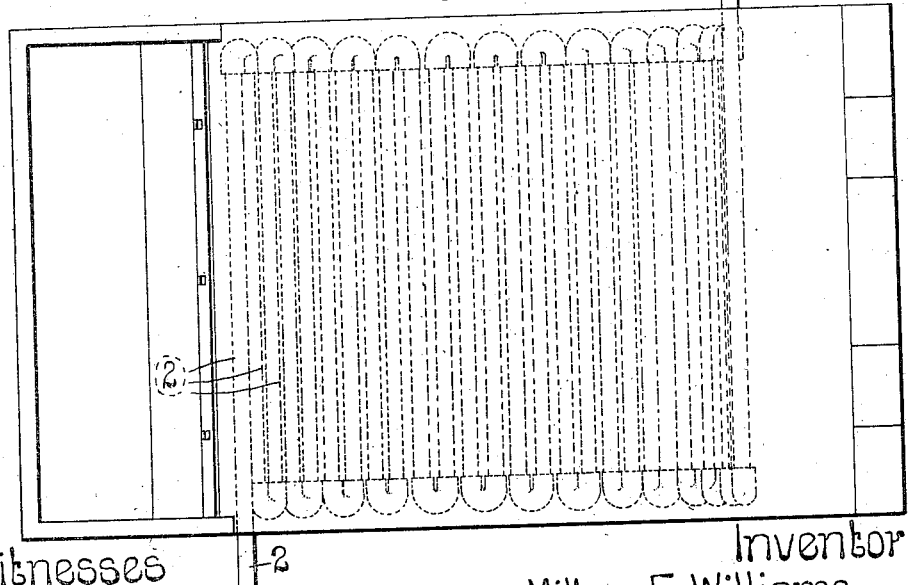

Figure 1 is a longitudinal sectional view through my improved machine; and Fig. 2 is a top plan view of the same.

This invention relates to a new and useful improvement in crushers and pulverizers, the object being to provide means for heating the grinding surface so that the machine can be used to reduce material such as wet clay, etc. which has a tendency to adhere to the grinding surface.

In the accompanying drawings I have illustrated the grinding surface as consisting of bars forming what is known as a cage, but it is obvious that this grinding surface may be a perforated plate or any other wellknown form of grinding surface, the object being to arrange the heating pipes separately from the grinding surface, but in close contact therewith, and to protect the heating pipes from the material which is reduced and which passes through the cage, so that said pipes will not be worn out.

In the drawings I have shown a wellknown type of crusher and pulverizer commonly known as the Williams mill, such as illustrated in Patent No. 589,236, dated August 31, 1897, granted to me, in which 1 indicates the grinding surface, in this instance in the form of cage bars having their outer faces slightly recessed. 2 are the heating pipes arranged in these recesses and on the outer face of the cage, said heating pipes being in the form of a coil, that is, the straight sections which coöperate with the grinding surface connect with couplings at the sides of the grinding surface so that a continuous passage for hot air or steam is provided.

In operation, hot air or steam is admitted to the pipes 2 which are connected, and the heat from said pipes is transmitted to the grinding surface.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

A crusher or pulverizer having a grinding surface which is provided with openings through which the pulverized material passes, and heating pipes arranged underneath said grinding surface in contact therewith and in alinement with the solid portions thereof; substantially as described.

In testimony whereof I hereunto affix my signature in the presence of two witnesses, this 28th day of March 1907.

MILTON F. WILLIAMS.

Witnesses:
F. R. CORNWALL,
GEORGE BAKEWELL.